United States Patent
Pfutzner et al.

(10) Patent No.: US 11,041,974 B2
(45) Date of Patent: Jun. 22, 2021

(54) X-RAY IMAGING DEVICE FOR CASED WELLS AND OPEN BOREHOLES

(71) Applicant: SCHLUMBERGER TECHNOLOGY CORPORATION, Sugar Land, TX (US)

(72) Inventors: Harold Pfutzner, Richmond, TX (US); Mohammed Badri, Al-Khobar (SA); Mustapha Abbad, Al-Khobar (SA)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/504,050

(22) Filed: Jul. 5, 2019

(65) Prior Publication Data
US 2021/0003739 A1 Jan. 7, 2021

(51) Int. Cl.
*G01N 21/85* (2006.01)
*G01N 21/93* (2006.01)
*G01V 5/12* (2006.01)

(52) U.S. Cl.
CPC ..................... *G01V 5/12* (2013.01)

(58) Field of Classification Search
CPC ........ G01N 21/85; G01N 21/93; G01N 21/25; G01N 2223/316; G01N 2223/505; G01N 2223/50; G01N 2223/345; G01N 2021/933
See application file for complete search history.

(56) References Cited

U.S. PATENT DOCUMENTS

2009/0041191 A1* 2/2009 Suzuki ................ G01N 23/046 378/98.5
2019/0212272 A1* 7/2019 Scoullar ................ E21B 49/005

* cited by examiner

*Primary Examiner* — Don K Wong
(74) *Attorney, Agent, or Firm* — Trevor G. Grove

(57) ABSTRACT

An x-ray imaging device for imaging a borehole environment employs a housing that encloses an x-ray generator spaced from an x-ray detector which cooperate to obtain an image of the borehole environment.

20 Claims, 3 Drawing Sheets

X-RAY IMAGING DEVICE FOR CASED WELLS AND OPEN BOREHOLES

FIELD

The present disclosure relates to devices, methods, and systems that produce images or maps of physical measurements of formation rock of open boreholes or cased wells as a function of measured depth and azimuth.

BACKGROUND

Borehole imaging devices are high resolution logging tools that produce images or maps of physical measurements of the rocks exposed on a borehole wall as a function of measured depth and azimuth. Currently-available borehole imaging devices typically employ two main techniques: ultrasonic reflection scanning and electrical scanning. The ultrasonic reflection scanning technique employs a rotating ultrasonic transducer that emits a pulse and receives the signal reflected by the borehole wall. The ultrasonic transducers can be either focused or unfocused and have frequencies in the range of 200 kHz to 1 MHz. Orientation of the ultrasonic transducer is normally measured by a magnetometer. Two types of images can be obtained: one based on the reflected amplitude and one on the two-way travel time. By convention, darker gray tones are used for lower reflected amplitudes and higher two-way travel times. The ultrasonic reflection scanning technique provides a borehole wall surface measurement and as such is affected by rugosity, drill marks, borehole ellipticity, and tool eccentricity. The electrical scanning technique is an extension of the dipmeter technique. In this method, an array of closely spaced electrodes is mounted on a conductive pad and pressed against the borehole wall. The amount of current emitted from each electrode is recorded as a function of azimuth and depth. The electrical scanning technique thus produces a map or image of micro-resistivity of the borehole wall as a function of measured depth and azimuth. The micro-resistivity image can cover a partial azimuth range corresponding to the positions of sensing electrodes on the sonde or it can cover the full azimuthal range. The full azimuthal image can be accomplished in several ways. If the device is part of a wireline sonde, then the array of sensing electrodes can cover the full circumference of the wireline sonde and thereby cover all azimuthal angles of the borehole wall. Alternatively, the array of sensing electrodes can be mounted on a rotating subassembly of the wireline sonde and will thereby contact the full azimuth of the borehole wall as the rotating subassembly rotates through a full 360 degrees. On the other hand, if the device is part of a drilling bottom hole assembly, then the array of sensing electrodes can contact the full azimuth of the borehole wall as the bottom hole assembly is rotated during the drilling process.

Higher resolution visual images using a closed-circuit television camera are sometimes obtained in a borehole, however this is limited in usefulness to wells where the borehole fluid is transparent such as air boreholes or gas-filled boreholes. This is most often not the case, since boreholes typically have oil, dirty water, and drilling mud in them.

The use of visual images and resistance images is always limited to open hole conditions, as neither technique can penetrate the steel casing of a cased well. There are instances when it is useful to make measurements after a well has been cased. For time and cost savings, borehole measurements while the borehole is not cased are limited to those that bring the most value. Sometimes, no borehole measurements whatsoever are made before the well is cased. Later, unplanned circumstances may create a need for borehole measurements in a well where certain measurements including borehole images were not obtained while the well was uncased. In this case, an image using visual or resistance images can never be obtained except under the dire circumstances where the well casing is removed for remedial actions.

In addition to the obvious case of well casing preventing the acquisition of electrical resistance images or visual images, there are many examples of borehole effects induced during the drilling process that can alter an image such that the image is not representative of the deeper formation away from the borehole. Instead, the image is more representative of the drilling process and the formation's reaction to that process.

Furthermore, drilling mud greatly affects borehole images. If it is oil-based mud, then the oil from the mud may replace saline water in the pores of the formation and thereby reduce or eliminate the contrast in electrical resistance between matrix rock and pores, vugs and fractures. Also, drilling mud will typically form a thin layer on the borehole wall called mudcake, which makes all borehole features invisible to visual imaging or electrical resistance imaging.

In the case of borehole images while-drilling, the mechanical action of the drill bit and bottom hole assembly of the drill string can affect the borehole imaging. Various features can be artifacts of drilling such as the spiral groove called cork-screwing. Some fractures at the borehole wall may be created during the drilling process or pre-existing fractures in the formation may be enlarged or extended during drilling. Portions of the borehole wall may break off and fall into the borehole, leaving voids that appear as blank areas in an image produced with electrical resistance measurements.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments of the present disclosure include an x-ray imaging device for imaging a borehole environment, which includes a housing that can be conveyed to different locations in the borehole environment. The housing encloses an x-ray generator spaced from an x-ray detector. The x-ray generator and the x-ray detector cooperate to obtain an image of the borehole environment adjacent the housing.

Additional aspects, embodiments, and advantages of the disclosure may be understood with reference to the following detailed description taken in conjunction with the provided drawings.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice.

The present disclosure addresses the above-described need for improved borehole imaging. Aspects of the present disclosure provide an x-ray imaging device that can provide an improved depth of investigation that does not rely on visual imaging or electrical resistance imaging. It can also be used to obtain an image in a cased well and/or to produce a medium to high resolution image that is less affected by near-borehole effects.

The x-ray imaging device is effective in the borehole environment due to a number of factors. First, the x-rays can be emitted with sufficient energy and quantity to pass through a well casing or to pass through near borehole damage with little interaction, so that an image can be obtained of the formation behind the casing and/or behind the near borehole damage. Second, the x-ray imaging device is suitable for operation in the borehole environment, which can include high temperatures, small borehole diameter, and a prevalence of mechanical shock and vibrational forces.

Figure 1A:
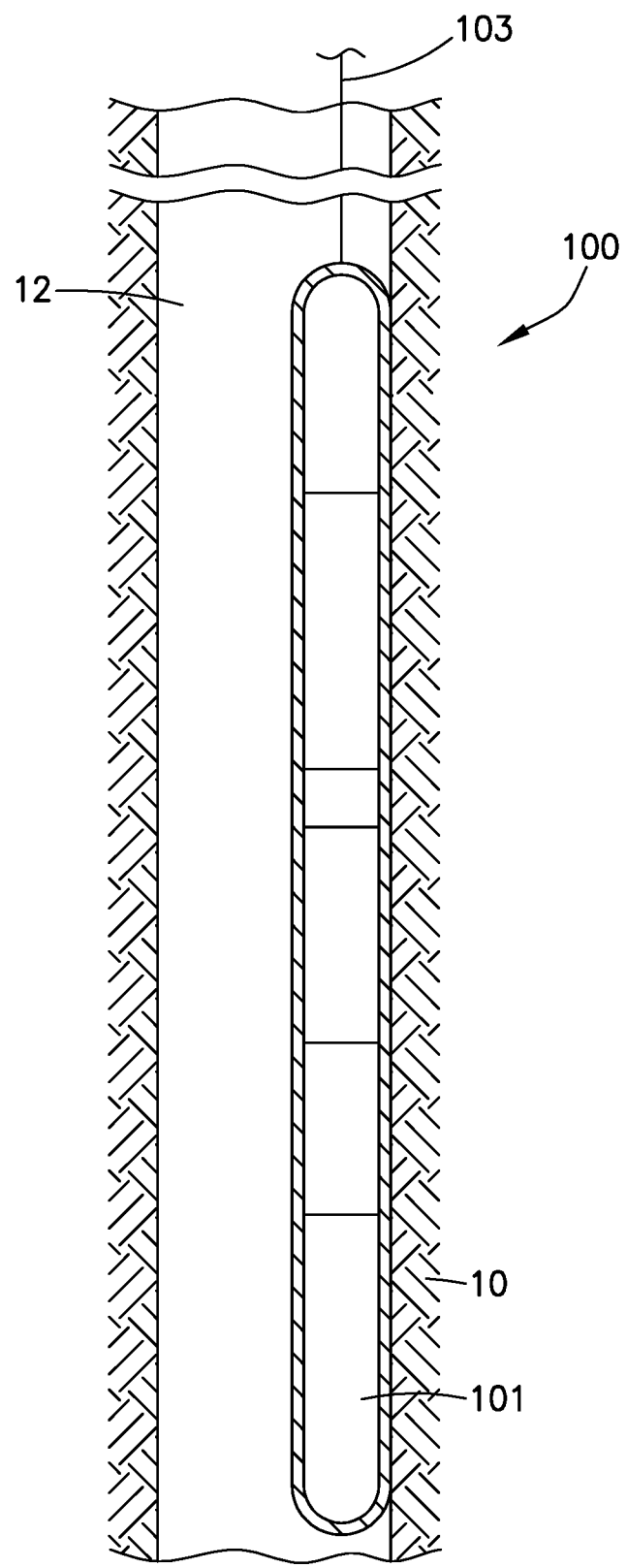
FIG. 1A is a schematic diagram depicting an exemplary wireline logging tool in which the exemplary embodiments of the present disclosure can be used.
Figure 1B:
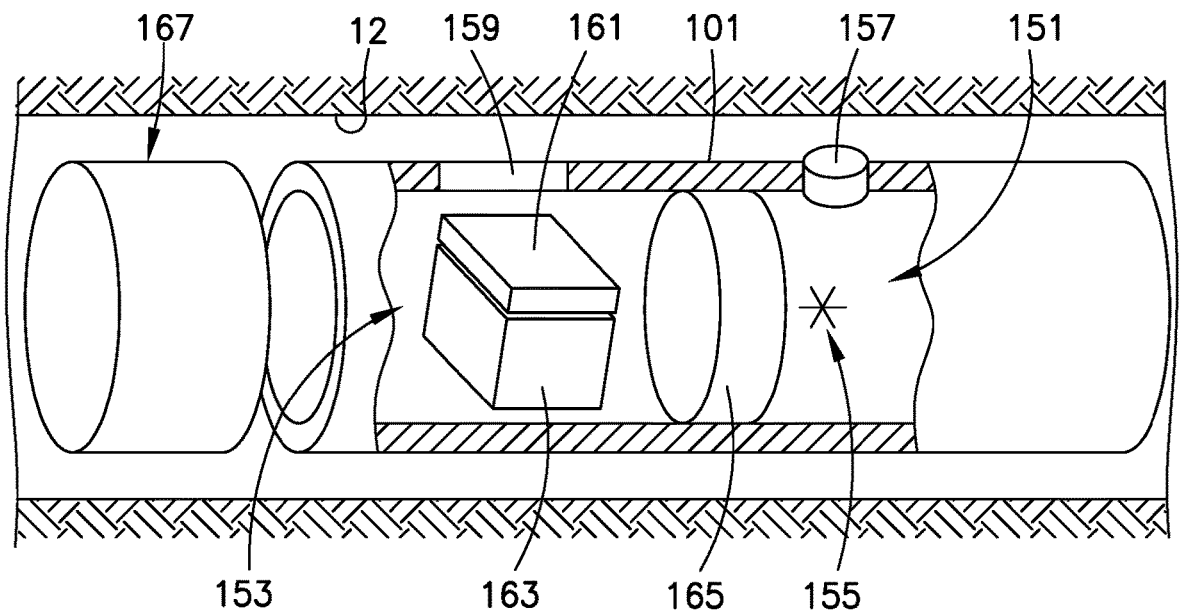
FIG. 1B is a schematic diagram of an exemplary x-ray imaging device according to the present disclosure.

Turning now to FIGS. 1A and 1B, an exemplary x-ray imaging device (apparatus or instrument or tool or sonde) 100 is shown for providing an image of an open borehole 12 that traverses a geological formation 10. The x-ray imaging device 100 comprises a housing 101 that is conveyed in the borehole 12 by a wireline 103 or other suitable conveyance means as shown in FIG. 1A. The housing 101 encloses an x-ray generator 151 and an x-ray detector 153 spaced from the x-ray generator 151 as shown in FIG. 1B. The x-generator 151 includes an x-ray source 155 that produces a beam of x-ray radiation that is directed through a first x-ray window 157 in the housing 101. The X-ray source 155 can perform many different functions, such as generating x-ray radiation, filtering of the x-ray radiation, and collimating the x-ray radiation such that it is focused or collimated into a beam of x-ray radiation that propagates in a primary direction. These functions can be accomplished using filters, focusing mirrors, a monochromator, and/or a collimator. The x-ray source 155 can employ a chemical radioactive source of x-ray radiation or an electronic x-ray tube. The first x-ray window 157 can employ material that allows for transmission of x-ray radiation therethrough, such as aluminum, beryllium, titanium or other suitable materials.

The beam of x-ray radiation that is transmitted through the first x-ray window 157 interacts with the surrounding borehole environment through Compton scattering that causes x-ray radiation to reflect back (or backscatter) toward the x-ray imaging device 100. The x-ray detector 153 includes a charge-coupled-device (CCD) X-ray detector 161 that is operably coupled in thermal contact with an active cooling device or system 163. The backscatter x-ray radiation that is incident on a second x-ray window 159 in the housing 101 can pass through the second x-ray window 159 where it is detected by the CCD X-ray detector 161. The second x-ray window 159 can employ material that allows for transmission of x-ray radiation therethrough, such as aluminum, beryllium, titanium or other suitable materials.

In embodiments, the CCD X-ray detector 161 includes a scintillator and a charge-coupled-device (CCD) image sensor. The scintillator converts the backscatter x-ray radiation incident thereon to light (photons) which is detected by the array of imaging pixels of the CCD image sensor. The CCD image sensor is in thermal contact with the active cooling device 163 that is configured to cool the CCD image sensor of the detector 161 such that the CCD image sensor of the detector 161 operates within its suitable operating temperature range when the tool 100 is used in the borehole environment. The suitable operating temperature range of the CCD image sensor is configured to avoid bridging of a semiconductor transition in the CCD image sensor that can occur at high temperatures. For example, given that the CCD image sensor is designed to operate in a normal operating temperature range between −60° C. and +60° C., the active cooling device 163 can provide active cooling in the borehole environment (which typically is at a high temperature much greater than +60° C.) in order to maintain the operating temperature of the CCD image sensor within its normal operating temperature range between −60° C. and +60° C. The active cooling device 163 includes a device external to the CCD image sensor that uses energy to cool the CCD image sensor. The active cooling device 163 can be a Stirling refrigeration cycle cooler, a Peltier cooler, a liquid $CO_2$ cooler or other suitable active cooling means. Note that the active cooling device 163 provides enhanced cooling of the CCD image sensor as compared to a passive cooling device, which utilize a heat spreader or heat sink to maximize natural convection heat transfer modes which do not consume energy.

The x-ray imaging device 100 can also include a shield 165 that is enclosed within the housing 101 and disposed between the x-ray generator 151 and the x-ray detector 153. The shield 165 can be configured to prevent direct x-ray flux from propagating from the x-ray generator 151 to the x-ray detector 153.

The x-ray detector 153 of FIG. 1B obtains an image for a portion of the azimuth of the surrounding borehole environment that is directly in front of the second x-ray window 159.

In embodiments, the x-ray imaging device 100 can employ a motor and slip ring arrangement 167 that can be electronically-controlled to rotate the device 100 about its central axis. Such rotation can be electronically controlled such that x-ray detector 153 of FIG. 1B rotates through a full 360-degrees of azimuth. In this manner, the operation of the motor and slip ring arrangement 167 can be electronically-controlled such that x-ray detector 153 scans an image(s) of any part or all of the full 360-degrees of azimuth of the surrounding borehole environment that is directly in front of the second x-ray window 159. In other embodiments, the conveyance means of the x-ray imaging device 100 can rotate to provide controlled rotation of the device 100 about its central axis similar to the motor and slip ring arrangement 167.

Figure 2:
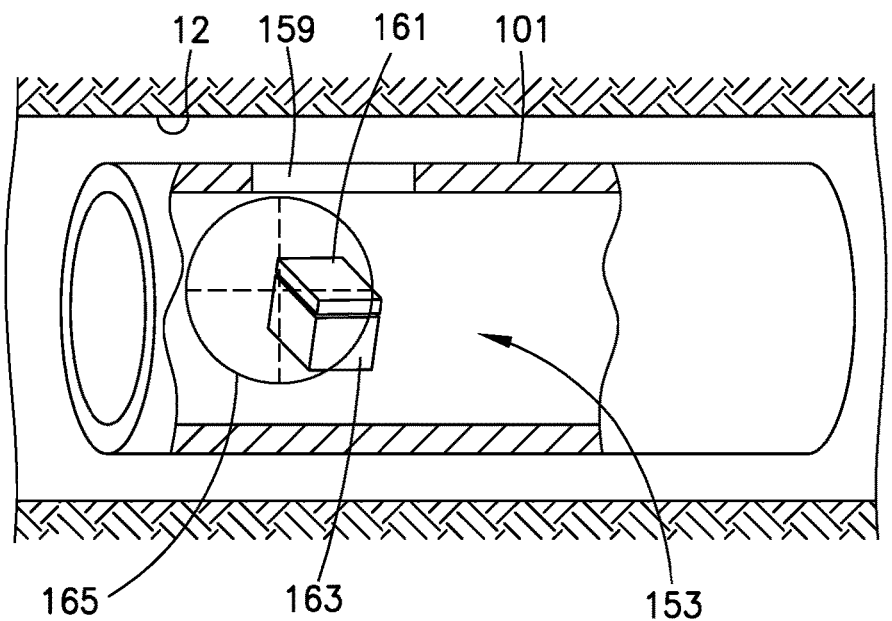
FIG. 2 is a schematic diagram of an illustrative embodiment of x-ray detector functionality that can be part of the x-ray imaging device of FIG. 1B.

In embodiments, the x-ray imaging device 100 can employ filtering of x-rays. The filtering can be used to sharpen an image and may be variable according to conditions of the borehole environment. The filtering can also be used to vary the depth of investigation of x-rays in the borehole environment, as x-rays of different energies may have different depths of investigation. In an embodiment depicted in FIG. 2, the filtering of the x-rays may be implemented as a segmented filter wheel 165 enclosed within the housing 101 and disposed between the second x-ray window 159 and the x-ray detector 153. The segmented filter wheel 165 can be driven by a stepper motor. In this configuration, different segments of the filter wheel 165 correspond to different filter thicknesses and/or filter materials.

Figure 3:
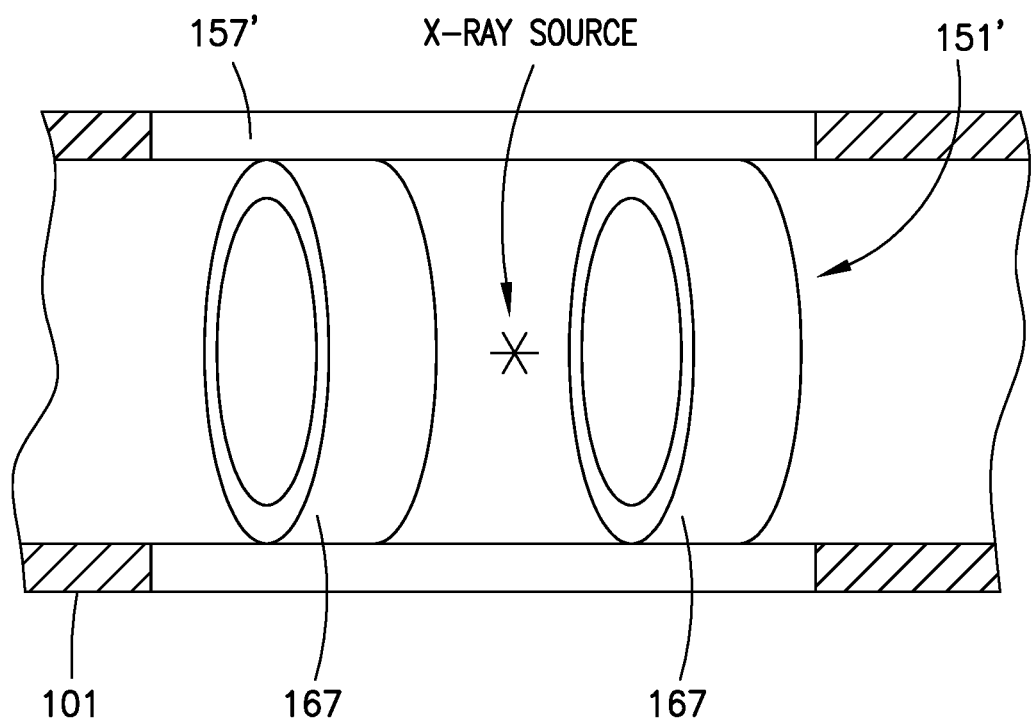
FIG. 3 is a schematic diagram of an illustrative embodiment of x-ray generator functionality that can be part of the x-ray imaging device.
Figure 4:
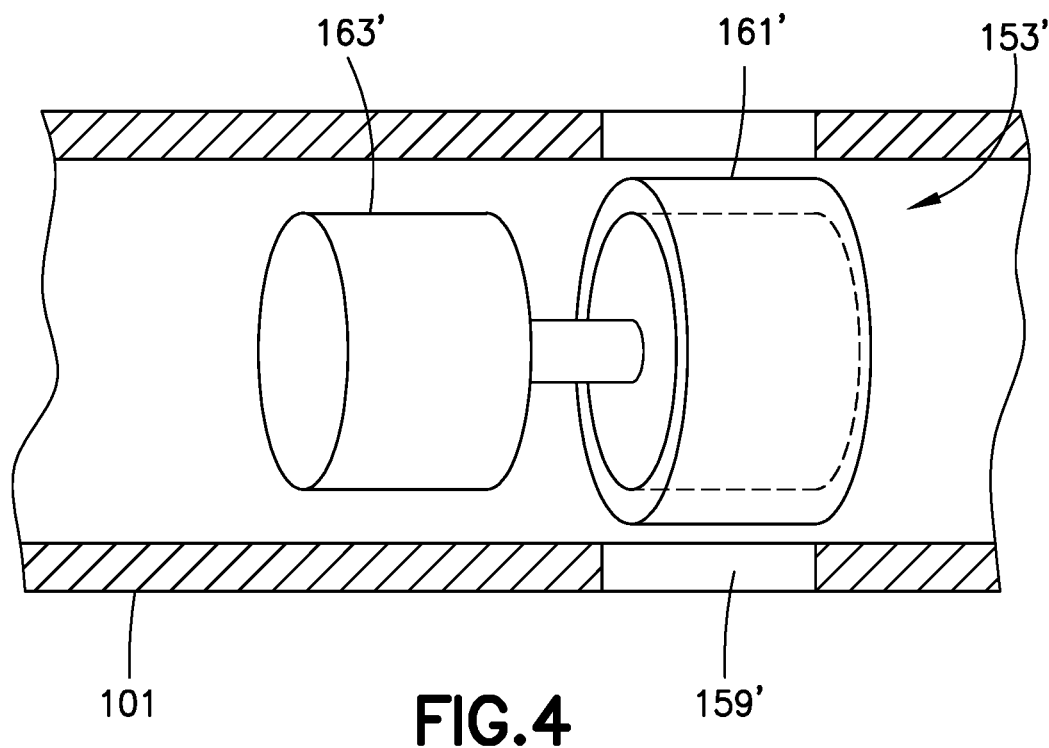
FIG. 4 is a schematic diagram of an illustrative embodiment of x-ray detector functionality that can be part of the x-ray imaging device.

In other embodiments, the x-ray imaging device can employ an x-ray generator 151' that employs cylindrical collimators 167 as shown in FIG. 3. The cylindrical collimators 167 collimate x-ray radiation into a beam that covers the full 360-degrees of azimuth in the surrounding borehole environment simultaneously. A cylindrical x-ray window 157' in the housing 101 can be provided to permit transmission of the collimated beam through the housing 101 to interact with the full 360-degrees of azimuth in the surrounding borehole environment simultaneously. The x-ray imaging device can also employ an x-ray detector 153' where a larger CCD X-ray detector is formed into a cylinder 161' as shown in FIG. 4. In this configuration, the cylindrical CCD X-ray detector 161' is operably coupled in thermal contact with an active cooling device 163' that cools the cylindrical CCD X-ray detector 161' in a manner similar to the one described above with respect to the embodiment of FIG. 2. A cylindrical x-ray window 159' in the housing 101 can be provided to permit transmission of incident backscatter x-ray radiation through the housing 101 to the cylindrical CCD X-ray detector 161' where it is detected by the cylindrical CCD X-ray detector 161'. This configuration allows for all 360-degrees of azimuth in the surrounding borehole environment to be imaged simultaneously. The x-ray detector 153' can employ a segmented filter cylinder (not shown) where longitudinal segments of the cylindrical filter correspond to different filter thicknesses and/or filter materials. The segmented cylindrical filter may be motor driven to slide up or down over the cylindrical CCD X-ray detector 161' when changing the filter is called for.

In other embodiments, the x-ray imaging device as described above can be part of a bottom hole assembly that terminates in a drilling bit for logging-while-drilling operations. In still other embodiments, the x-ray imaging device as described above can be deployed in a cased well environment (borehole with a casing, cement behind the casing, and a formation behind the cement) to produce an image of the cased well environment and to display or otherwise output the image of the cased well environment.

The x-ray imaging device as described herein can be operated to obtain an x-ray image of the borehole wall of an oil or gas well. In an open borehole, the x-rays generated by the x-ray generator of the imaging device can have a depth of investigation of several inches beyond the borehole wall to obtain images of the near borehole formation (which is offset from the borehole wall). In addition, the x-rays generated by the x-ray generator of the imaging device can penetrate the surface layer of the borehole wall in order to form a more representative image of the formation without the effects of the drilling process that formed the open borehole. Such images cannot be obtained by resistance electrodes or visual cameras. Furthermore, in a cased hole with a steel casing, cement behind the casing, and a formation behind the cement, the x-rays generated by the x-ray generator of the imaging device can have sufficient energy and quantity such that x-rays penetrate the steel casing. Such x-rays can be used to interact with and produce an image of the cement behind the casing and/or interact with and produce an image of the formation behind the cement.

In the example of the cased well environment mentioned above, it may be desirable to identify channels and voids within the cement behind that casing that may result in unintended fluid flows between reservoir layers. In the example of the open borehole mentioned above, it may be desirable to observe the condition of fractures in their state prior to drilling effects. For example, the appearance of fractures right at the borehole wall may have been altered by the buildup of mudcake, by break out of the rock, by enlargement or extension due to drilling mud over pressure or under pressure, and by etching patterns from the wobbling of the drill bit. Obtaining an x-ray image with a depth of investigation of a few inches can reduce or eliminate the effects of such near borehole damage on the image quality.

The x-ray source and x-ray detector of the x-ray imaging device can be compact, rugged, modest cost, and optimized for use with high resolution detectors, which are all useful characteristics for well logging applications. Furthermore, the use of the active cooling device to cool the CCD X-ray detector allows the CCD X-ray detector of the imaging device to function properly in high temperature borehole environments.

In embodiments, the electrical power or mechanical power that is used by the active cooling device to cool the CCD X-ray detector can be transmitted by the wireline from the surface to the instrument housing or can be provided by batteries or mud motors or turbines within a Logging While Drilling bottom hole assembly or other suitable power supplies.

It will be understood that the invention is not limited to any particular X-ray detector types and configurations. For example, an active pixel image sensor or CMOS (complementary metal oxide) image sensor can be used in place of a CCD image sensor as part of the X-ray detector. In this case, the active pixel image sensor or CMOS image sensor of the X-ray detector are semiconductor devices that suffer from bridging of a semiconductor transition at the high temperature of the borehole environment as described above with respect to the CCD image sensor. To address this problem, the x-ray imaging device can employ an active cooling device that cools the active pixel image sensor(s) or CMOS image sensor(s) of the X-ray detector in a manner similar to cooling of the CCD image sensor as described above.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. An x-ray imaging device for imaging a borehole environment, comprising:
a housing that can be conveyed to different locations in the borehole environment, wherein the housing encloses an x-ray generator spaced from an x-ray detector, wherein the x-ray generator and the x-ray detector cooperate to obtain an image of the borehole environment adjacent the housing, wherein the x-ray detector comprises a semiconductor image sensor that is thermally coupled to an active cooling device or system that cools the semiconductor image sensor in the borehole environment, wherein the active cooling device or system is selected from the group consisting of: a Stirling refrigeration cycle cooler, a Peltier cooler, and a liquified $CO_2$ cooler.

2. The x-ray imaging device of claim 1, wherein:
the semiconductor image sensor is selected from the group consisting of: a charge-coupled-device image sensor, an active pixel image sensor, and a CMOS image sensor.

3. The x-ray imaging device of claim 1, wherein:
electrical power or mechanical power is provided to the active cooling device or system for use in cooling the semiconductor image sensor in the borehole environment by a wireline, batteries or a downhole mud motor.

4. The x-ray imaging device of claim 1, wherein:
the x-ray detector is configured to obtain an image of a partial azimuth of the borehole environment surrounding the housing.

5. The x-ray imaging device of claim 1, further comprising:
means for rotating the x-ray generator and the x-ray source to obtain an image of full azimuth of the borehole environment surrounding the housing.

6. The x-ray image device of claim 5, wherein:
the means for rotating comprises an electrically-controlled motor and slip ring arrangement.

7. The x-ray imaging device of claim 1, wherein:
the x-ray generator comprises at least one cylindrical collimator configured to emit a beam of x-ray radiation that covers full azimuth of the borehole environment surrounding the housing.

8. The x-ray imaging device of claim 1, wherein:
the x-ray detector comprises a cylindrical x-ray detector that obtains an image of the full azimuth of the borehole environment surrounding the housing.

9. The x-ray imaging device of claim 1, further comprising:
an x-ray filtering element enclosed within the housing and operably coupled to the x-ray detector.

10. The x-ray imaging device of claim 9, wherein:
the x-ray filtering element has different filter materials and thicknesses that are selectively used to obtain images based on x-rays of different energies.

11. The x-ray imaging device of claim 10, wherein:
the x-rays of different energies correspond to different depths of investigation into the borehole environment that surrounds the housing.

12. The x-ray imaging device of claim 10, wherein:
the x-ray filtering element is selected from the group consisting of a segmented filter wheel and a segmented filter cylinder.

13. The x-ray imaging device of claim 1, wherein:
the borehole environment comprises an open borehole in a wireline or while-drilling application or a cased well.

14. The x-ray imaging device of claim 1, wherein:
the borehole environment comprises an open borehole with a borehole wall and a near borehole formation offset from the borehole wall.

15. The x-ray imaging device of claim 14, wherein:
the x-ray generator is configured to emit x-rays that penetrate several inches of depth beyond the borehole wall to obtain an image of a near borehole formation offset from the wall of the open borehole.

16. The x-ray imaging device of claim 14, wherein:
the x-ray generator is configured to emit x-rays that produce an image of the formation without effects of the drilling process that formed the open borehole.

17. The x-ray imaging device of claim 1, wherein:
the borehole environment comprises a cased well with a casing, cement behind the casing, and a formation behind the cement.

18. The x-ray imaging device of claim 16, wherein:
the x-ray generator is configured to emit x-rays that penetrate the casing and produce an image of the cement behind the casing; or
the x-ray generator is configured to emit x-rays that penetrate the casing and produce an image of the formation behind the cement.

19. An x-ray imaging device for imaging a borehole environment, comprising:
a housing that can be conveyed to different locations in the borehole environment, wherein the housing encloses an x-ray generator spaced from an x-ray detector, wherein the x-ray generator and the x-ray detector cooperate to obtain an image of the borehole environment adjacent the housing, and an x-ray filtering element enclosed within the housing and operably coupled to the x-ray detector.

20. The x-ray imaging device of claim 19, wherein:
the x-ray filtering element has different filter materials and thicknesses that are selectively used to obtain images based on x-rays of different energies.

\* \* \* \* \*